US011454510B1

(12) United States Patent
Gray et al.

(10) Patent No.: US 11,454,510 B1
(45) Date of Patent: Sep. 27, 2022

(54) MONITORING OF DATA TO PREDICT ROAD CONDITIONS

(71) Applicant: United Services Automobile Association (USAA), San Antonio, TX (US)

(72) Inventors: Emily Margaret Gray, San Antonio, TX (US); Daniel Christopher Bitsis, Jr., San Antonio, TX (US); Qunying Kou, San Antonio, TX (US); Robert Wiseman Simpson, Fair Oaks Ranch, TX (US); Manfred Amann, San Antonio, TX (US); Donnette Moncrief Brown, San Antonio, TX (US); Eric David Schroeder, San Antonio, TX (US); Meredith Beveridge, San Antonio, TX (US); Michael J. Maciolek, Boerne, TX (US); Bobby Lawrence Mohs, San Antonio, TX (US); Brian Francisco Shipley, Plano, TX (US); Justin Dax Haslam, San Antonio, TX (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 168 days.

(21) Appl. No.: 16/823,008

(22) Filed: Mar. 18, 2020

Related U.S. Application Data

(60) Provisional application No. 62/820,053, filed on Mar. 18, 2019.

(51) Int. Cl.
*G01C 21/36* (2006.01)
*G07C 5/00* (2006.01)
(Continued)

(52) U.S. Cl.
CPC ......... *G01C 21/3664* (2013.01); *G07C 5/008* (2013.01); *G07C 5/085* (2013.01); *G01S 19/39* (2013.01)

(58) Field of Classification Search
USPC ....................................................... 701/519
See application file for complete search history.

(56) References Cited

U.S. PATENT DOCUMENTS

| 8,977,422 B1 * | 3/2015 | Westfall | G07C 5/006 |
| | | | 701/30.6 |
| 10,275,662 B1 * | 4/2019 | Askeland | G06T 7/0004 |

(Continued)

*Primary Examiner* — Tyler D Paige
(74) *Attorney, Agent, or Firm* — Fletcher Yoder P.C.

(57) ABSTRACT

The present disclosure relates to monitoring data in and around a vehicle to predict anomalous, e.g., unsafe, road conditions, and using the data to suggest a corrective action to avoid the unsafe road conditions. A computing device receives information indicative of imagery, sound, or vehicle operation via sensors and/or cameras mounted in or near a vehicle. The information may be received via the vehicle itself or via a device. The computing device then determines whether there is an indication of an anomalous road condition. The computing device also receives vehicle operation data extracted from one or more vehicle sensors. The computing device then determines whether there is an indication of unsafe road conditions, and if there is, the computing device may output a notice or alert via a notification system to alert the driver.

19 Claims, 4 Drawing Sheets

(51) Int. Cl.
 *G07C 5/08* (2006.01)
 *G01S 19/39* (2010.01)

(56) References Cited

U.S. PATENT DOCUMENTS

| | | | | |
|---|---|---|---|---|
| 10,486,485 | B1* | 11/2019 | Levinson | B60G 17/0162 |
| 2011/0060478 | A1* | 3/2011 | Nickolaou | G01S 17/931 |
| | | | | 701/1 |
| 2017/0106855 | A1* | 4/2017 | Lavoie | B60W 40/06 |
| 2018/0107216 | A1* | 4/2018 | Beaurepaire | B60W 50/08 |

* cited by examiner

MONITORING OF DATA TO PREDICT ROAD CONDITIONS

CROSS-REFERENCE TO RELATED APPLICATION

This application claims priority to and the benefit of U.S. Provisional Application No. 62/820,053, entitled "MONITORING OF DATA TO PREDICT ROAD CONDITIONS," filed Mar. 18, 2019, which is hereby incorporated by reference in its entirety for all purposes.

BACKGROUND

The present disclosure relates generally to driving systems, and more particularly to systems and methods for using sound information to detect unsafe road conditions.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

A variety of factors may cause unsafe road events, such as construction, road work/repairs, etc. It is now recognized that systems and methods for detecting such conditions and mitigating effects on driving are desirable.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Provided herein are techniques that identify road conditions based on vehicle information, e.g., vehicle telematics and/or vehicle sensor information. Certain detectable characteristics of a road condition may be identified using one or more onboard sensors of a vehicle and/or vehicle movement behavior telematics. In some embodiments, a vehicle telematics system may gather and communicate, information about a vehicle location, vehicle operation, and/or vehicle diagnostics. As referred to herein, telematics conditions may include vehicle telematics information such as global position system (GPS) coordinates, vehicle operation data, vehicle sensor data and vehicle diagnostics and data.

The present disclosure relates generally to monitoring telematics conditions (e.g., GPS coordinates, onboard diagnostics, sound data, visual data, gyroscopic or directional data, vehicle movement data) to predict unsafe road conditions, and more particularly to systems and methods for using the telematics conditions to detect changes in road conditions. For example, a change in road condition may be a development of a pothole, or a repair of a previously-existing pothole. In some embodiments, the detection may result in an output suggesting a corrective action to reduce the driver's chances of encountering the unsafe road condition and/or to suggest a corrective action to the driver or other drivers in communication with the system. In some embodiments, an onboard or remote computing device may receive the vehicle telematics, e.g., may receive information indicative of GPS coordinates, onboard diagnostics, sound data, visual data, gyroscopic or directional data, vehicle operation data and vehicle movement data (e.g., braking data, steering data, speed data) of the vehicle. The computing device then determines whether there is an indication of an unsafe road condition (e.g., construction, pot holes, speed bumps, road defects, guard rail damage or a combination thereof). The computing device may, in certain embodiments, receive telematic data extracted from one or more onboard vehicle sensors that are. The vehicle sensor/sensors may include but are not limited to a motion sensor, an accelerometer, a gyroscope, a wheel sensor, a camera, or any combination thereof. The computing device then determines whether there is an indication of unsafe road conditions, and if there is, the computing device may output a notice or alert via a notification system to alert the driver or, in certain embodiments, other parties such as an insurance company, rental car company, and the like.

In this manner, the disclosed systems and methods may detect unsafe road conditions and suggest a corrective action to reduce the driver's chances of encountering the unsafe road condition and/or to suggest a corrective action to the driver. In additional or alternative embodiments, the data compiled by the electronic device may be used by vehicle related businesses (e.g., rental vehicles, autonomous vehicles, etc.) or other users.

Figure 1:
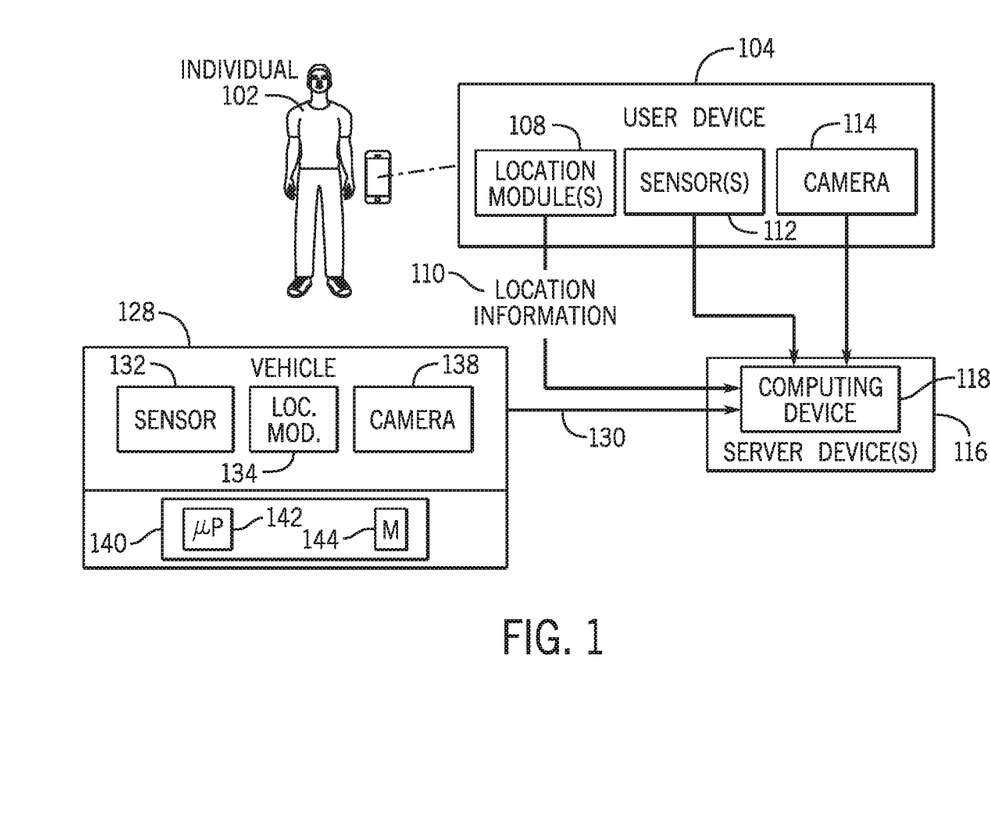
FIG. 1 illustrates a block diagram of a road condition identification system, according to implementations of the present disclosure.

FIG. 1 depicts an example system for a road condition identification system, according to implementations of the present disclosure. As shown in the example of FIG. 1, an individual 102 may own, operate, or otherwise be associated with a user device 104. The user device 104 may include any suitable type of computing device. In some instances, the user device 104 is a portable computing device such as a smartphone, tablet computer, wearable device, implanted computer, automotive computer, portable gaming platform, and so forth, the location of which may change throughout the course of a day or other period of time as the individual 102 moves about. In some embodiments, the user device 104 may also be a less portable type of computing device, such as a desktop computer, laptop computer, game console, smart appliance, and so forth.

In general, the user device 104 captures a variety of data (e.g., sound data, etc.) associated with the user via one or more sensors 112 or user input devices. The sensors 112 may include any number or type of sensors, including sound detection sensors, proximity sensors, accelerometers, gyroscopes, and/or biometric sensors.

In addition to the sensor(s) of the user device 104, implementations described herein include one or more sensors or devices that are associated with a vehicle and that are configured to provide location information 110. For example, vehicle data 130 may be generated by a vehicle 128. The vehicle data 130 may include data from one or more vehicle sensors 132, which in some embodiments may include one or more onboard cameras 138, and vehicle location data from a location module 134. The vehicle data 130 may also include data from a vehicle controller 140, which may be in communication with the sensors 132 (e.g., the camera 138) and the location module 134. Vehicle operation data may be collected by a processor 142 and stored in a memory 144 of the vehicle controller. Such operation data may include motor operation data that is indicative of a time period of vehicle operation, wheel speed data, steering data, etc. While such vehicle operation data may be gathered by the onboard sensors 132, the vehicle operation data may also include data from control circuitry of various components of the vehicle indicative of control signals provided to activate or operate the respective components. In one example, the vehicle controller 140 may record activation of a braking system, and a strength of the activation, as part of the vehicle operation data, which may be assessed in the context of other concurrent data (e.g., vibration data) to identify a speed bump.

In some instances, one or more vehicle sensors 132 may be onboard an external surface or structure of the vehicle 128. The sensors 112 and/or the vehicle sensors 132 may capture data that is used in the present techniques. Such data may include sound data, visual data, gyroscopic or directional data, vehicle movement data, and other types of data. Sound data may include a current level of sound detected at the user device 104 or sound in or around the vehicle 128. Sound may be described using any suitable unit of measure, such as decibels. Sound data may also include a description of one or more frequencies of sound detected at the user device 104. Sound data may also include a description of patterns of sound detected at the user device 104, such as noises caused by road hazards, potholes, construction, and/or other identifiable sounds. Accordingly, the sensors 112 and/or 132 may include sensors configured to capture sound data, such as audio input sensor(s) such as microphone(s).

The sensors 112 and/or the vehicle sensors 132 may also capture data to monitor the vehicle's movement. For example, sensors 112 and/or the vehicle sensors 132 may include one or vehicle operation sensors (e.g., a shock sensor, a motion sensor, an accelerometer, a gyroscope, and/or a wheel sensor). The movement data may include a speed of the vehicle, a direction the vehicle is traveling, impact or vibrations experienced while driving in the vehicle, and/or sudden changes in movement (e.g., changes in direction or a sudden impact) of the vehicle. The movement data may be described in any suitable unit (e.g., miles per hour, kilometers per hour, north, west, south, east, etc.). It may be appreciated that the movement data can be compared to other data to determine that the vehicle has approached a hazardous road condition. For example, a sudden movement of the vehicle 128 combined with certain sounds (e.g., sound on impact, driver's utterance, etc.) may indicate presence of a pothole.

Visual data may include imagery captured from one or more cameras 114 of the user device 104 or camera/s 138 (e.g., a dash camera, a backup camera, a front camera, a rear camera, a side camera, or any other camera) within or mounted to the vehicle 128. It may be appreciated that one or more of the user device cameras 114 or vehicle cameras 138 may begin to record when the vehicle 128 is started. In some embodiments, certain cameras 138 may be activated when the vehicle 128 is put into reverse or when the camera is activated via a motion sensor. Certain changes to the imagery captured by the cameras 138 may be indicative of unsafe road conditions. For example, when the imagery suddenly jerks or jolts, or cuts out, this could indicate presence of an unsafe road condition, such as a potholes, speed bumps, etc.

The user device 104 and/or the vehicle 128 may execute one or more location modules 108, 134 that determine a location of the vehicle 128. The location of the vehicle 128 may be determined using any suitable technique(s), to any appropriate degree of specificity. For example, the vehicle 128 may include location sensor(s), transceiver(s), and/or other software or hardware component(s) that are configured to determine the location using one or more of the following: an inertial navigation system, a dead-reckoning navigation system, a network positioning system, a radio position finding system, a satellite-based navigation system, an accelerometer system, a gyroscope system, and so forth. The satellite-based navigation system may include one or more of a Global Positioning System (GPS) receiver, a Globalnaya Navigatsionnaya Sputnikovaya Sistema (GLONASS) receiver, a Galileo receiver, an Indian Regional Navigational Satellite (IRNS) System receiver, and so forth. The location may also be determined through geolocation based on an internet protocol (IP) address of the user device 104. In some cases, the location of the user device 104 and/or the vehicle 128 may be determined based on previously collected information describing the user device 104 and/or the individual 102, such as a previously specified address of the individual's home, workplace, social network posts, or other information indicating the individual's presence at a location such as a restaurant, store, or other location, and so forth.

The location determined by the location module(s) 108, 134 may be communicated as location information 110 from the user device 104 and/or as part of the vehicle information 130 to one or more computing devices 118 executed on one or more server devices 116. The server device(s) 116 may include any suitable number and type of computing devices. The computing device 118 may receive the location information data 110 to vehicle operation data 130 of the vehicle 128 to determine whether an unsafe road condition is present.

The vehicle data 130 that is collected may include data extracted from the vehicle sensors 132. The vehicle sensors 132 may include a motion sensor, an accelerometer, a gyroscope, a microphone, a wheel sensor, a camera, or any combination thereof. The vehicle data 130 may include information extracted from an onboard vehicle processor, such as motor activity, speed of the vehicle, and/or activation of vehicle driving systems, that are characteristic of vehicle operation. Such information may further be correlated to location information 110 to confirm or further define the driving conditions of the vehicle 128 to assess the likelihood of an unsafe road condition.

The computing device 118 may determine a degree of likelihood that an unsafe driving condition is occurring. For example, the computing device 118 may determine via the vehicle data 130 detected by the vehicle sensors 132 (e.g., noise detected by the noise detection sensors) a likelihood of an occurrence of construction, pot holes, traffic conditions, speed bumps, road defects, or a combination thereof. Details of the computing devices 118, the vehicle 128, and/or the user device 104 may be further understood with reference to FIG. 2.

Figure 2:
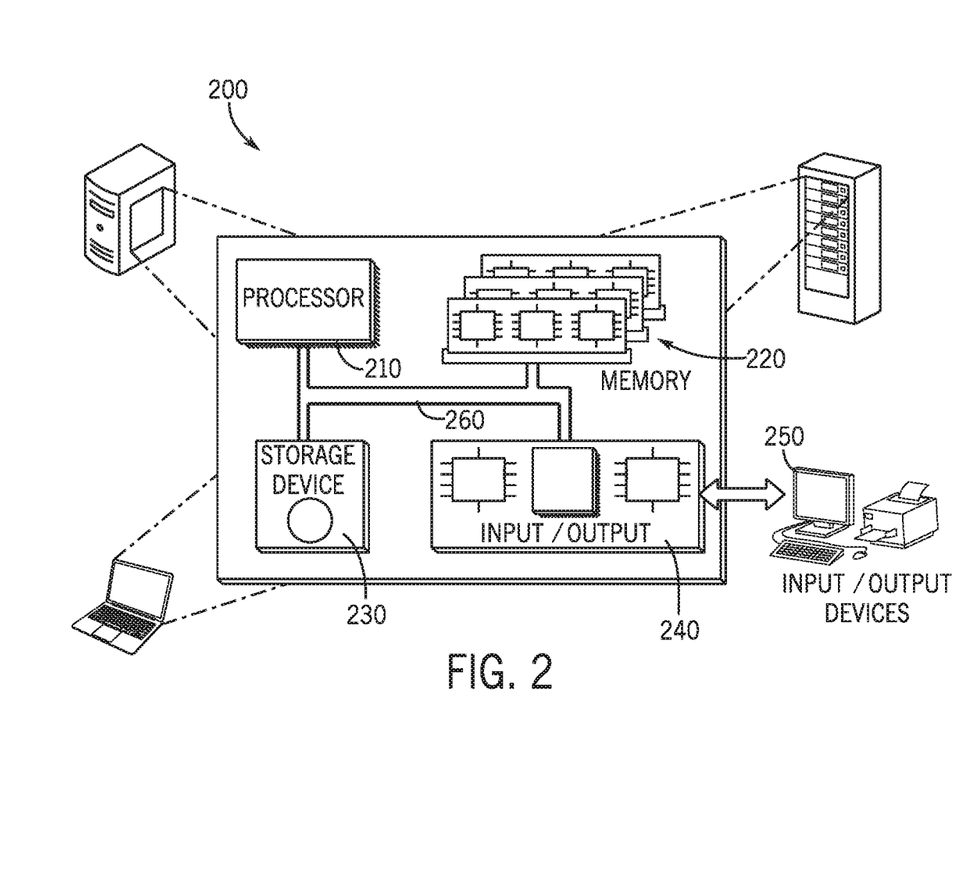
FIG. 2 depicts an example road condition computing system, according to implementations of the present disclosure.

FIG. 2 depicts an example computing system, according to implementations of the present disclosure. The system 200 may be used for any of the operations described with respect to the various implementations discussed herein. For example, the system 200 may be included, at least in part, in one or more of the user devices 104, the server device(s) 116, the computing device 118, the vehicle 128, and/or other device(s) described herein. The system 200 may include one or more processors 210, a memory 220, one or more storage devices 230, and one or more input/output (I/O) devices 250 controllable through one or more I/O interfaces 240. The various components 210, 220, 230, 240, or 250 may be interconnected through at least one system bus 460, which may enable the transfer of data between the various modules and components of the system 200.

The processor(s) 210 may be configured to process instructions for execution within the system 200. The processor(s) 210 may include single-threaded processor(s), multi-threaded processor(s), or both. The processor(s) 210 may be configured to process instructions stored in the memory 220 or on the storage device(s) 230. The processor(s) 210 may include hardware-based processor(s) each including one or more cores. The processor(s) 210 may include general purpose processor(s), special purpose processor(s), or both.

The memory 220 may store information within the system 200. In some implementations, the memory 220 includes one or more computer-readable media. The memory 220 may include any number of volatile memory units, any number of non-volatile memory units, or both volatile and non-volatile memory units. The memory 220 may include read-only memory, random access memory, or both. In some examples, the memory 220 may be employed as active or physical memory by one or more executing software modules.

The storage device(s) 230 may be configured to provide (e.g., persistent) mass storage for the system 200. In some implementations, the storage device(s) 230 may include one or more computer-readable media. For example, the storage device(s) 230 may include a floppy disk device, a hard disk device, an optical disk device, or a tape device. The storage device(s) 230 may include read-only memory, random access memory, or both. The storage device(s) 230 may include one or more of an internal hard drive, an external hard drive, or a removable drive.

One or both of the memory 220 or the storage device(s) 230 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 200. In some implementations, the CRSM may include a data store that provides storage of computer-readable instructions or other information in a non-transitory format. The CRSM may be incorporated into the system 200 or may be external with respect to the system 200. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 210 and the memory 220 may be supplemented by, or incorporated into, one or more application-specific integrated circuits (ASICs).

The system 200 may include one or more I/O devices 250. The I/O device(s) 250 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 250 may also include one or more output devices such as a display, LED(s), an audio output device (e.g., a speaker), a printer, a haptic output device, and so forth. The I/O device(s) 250 may be physically incorporated in one or more computing devices of the system 200, or may be external with respect to one or more computing devices of the system 200.

The system 200 may include one or more I/O interfaces 240 to enable components or modules of the system 200 to control, interface with, or otherwise communicate with the I/O device(s) 250. The I/O interface(s) 240 may enable information to be transferred in or out of the system 200, or between components of the system 200, through serial communication, parallel communication, or other types of communication. For example, the I/O interface(s) 240 may comply with a version of the RS-232 standard for serial ports, or with a version of the IEEE 1284 standard for parallel ports. As another example, the I/O interface(s) 240 may be configured to provide a connection over Universal Serial Bus (USB) or Ethernet. In some examples, the I/O interface(s) 240 may be configured to provide a serial connection that is compliant with a version of the IEEE 1394 standard.

The I/O interface(s) 240 may also include one or more network interfaces that enable communications between computing devices in the system 200, or between the system 200 and other network-connected computing systems. The network interface(s) may include one or more network interface controllers (NICs) or other types of transceiver devices configured to send and receive communications over one or more networks using any network protocol.

Computing devices of the system 200 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 200 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Figure 3:
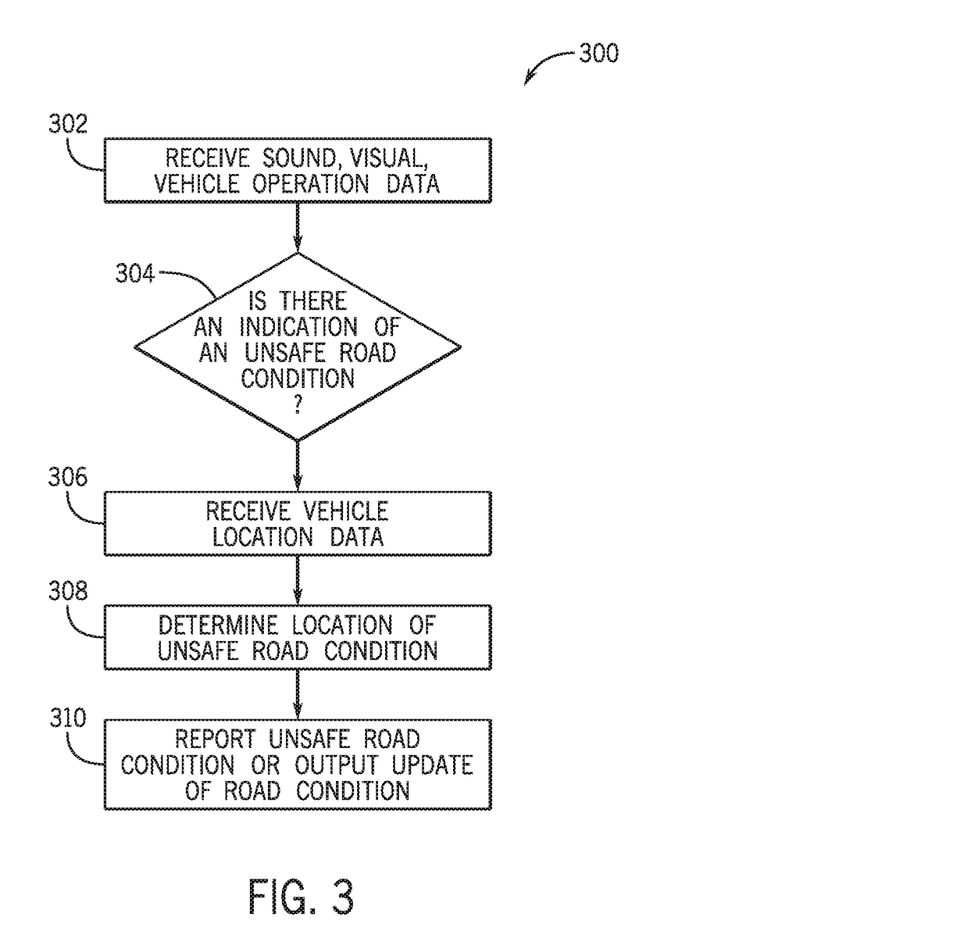
FIG. 3 depicts a flow diagram of an example process for monitoring of sound data and vehicle data to identify unsafe road conditions, according to implementations of the present disclosure.

FIG. 3 depicts a flow diagram of an example process 300 for monitoring of vehicle data to identify unsafe road conditions, according to implementations of the present disclosure. At block 302, the computing device 118 may receive information indicative of imagery or a sound in or near the vehicle 128 or of operation of the vehicle 128. As described above, the sound information can be received via the device 104 (e.g., the device sensors 112) or via the vehicle 128 (e.g., the vehicle sensors 132) disposed internal or external to the vehicle 128. The imagery information can be received via the device 104 (e.g., the device camera 114) or the vehicle 128 (e.g., the front camera, the side camera, etc.). The vehicle operation data may be received via the shock sensor, the motion sensor, the accelerometer, the gyroscope, and/or the wheel sensor.

At block 304, the computing device 118 determines whether there is an indication of an anomalous (e.g., unsafe or undesirable) road condition. Examples of anomalous road conditions may include, but are not limited to, construction, pot holes, traffic conditions, road changes (e.g., road split or damage), speed bumps, or a combination thereof. In one embodiment, identifying whether an unsafe road condition is present is determined in part by detecting a change in movement of the vehicle or a change in imagery captured by the cameras 114 disposed in the vehicle 128 or the device 104. The computing device 118 may assess the change in movement or imagery to perform an assessment of the driving conditions. For example, the computing device 118 may determine that a change in the movement of the vehicle 128 or a jerking in the imagery captured by the camera 114 may indicate an encounter with an unsafe road condition (e.g., a road split, a speed bump, a pot hole, etc.). In one example, camera images from a camera 114, 138 over a time window are analyzed to identify sudden movements of identified features in adjacent frames or stills that are characteristic of the vehicle 128 driving over a pothole. Such data may be assessed in the context of vehicle vibration data. For example, a sudden camera jerking and a hard vibration of the vehicle 128 may be indicative of a pothole, while a swaying-type vibration of lower impact and camera jerking may be indicative of a speed bump. Further, a speed bump may cause vibration or similar effects on both driver and passenger wheels at the same time, while a pothole may have a disproportionate vibration effect on the wheel in direct contact with (driving over) the pothole relative to the other wheels. In another example, a low frequency humming noise coupled with an ongoing increase in vibrations sensed may be indicative of a road repair condition in which a nature of the road surface has changed and/or is grooved or unfinished.

The computing device 118 may also receive sound data to perform an assessment of the driving conditions. For example, the vehicle 128 or the driver or passenger may make certain noises in response to encountering the unsafe road condition. For example, the vehicle 128 may make certain type of noise when encountering a pothole or the driver may audibly complain about the presence of such unsafe road conditions.

At block 306, the computing device receives the vehicle location data. As discussed above, the vehicle data 130 may include data extracted from the vehicle sensors 132. The vehicle sensors 132 may include, but are not limited to, a GPS sensor, a motion sensor, an accelerometer, a gyroscope, a wheel sensor, a camera, or any combination thereof.

At block 308, the computing device 118 determines a location of the unsafe road conditions. In one example, the computing device 118 may use the location information to determine a general location of the unsafe road condition. The computing device 118 may provide the location of the unsafe road condition via GPS coordinates, an intersection, a block number on a street, a vicinity to a local landmark, or the like. It may be appreciated that in some embodiments, a user can manually input the location information of an unsafe road condition.

At block 310, the computing device 118 may perform an action to report the occurrence of the unsafe road condition and/or output an update of the road condition. For example, the computing device 118 may output a notice or alert via a notification system of the vehicle 128 or the device 104. In some embodiments, the notification system may output the notice or alert via messaging via social media, text message, chat programs, phone calls, and the like. The notification system may alert the driver, the passenger, or any other individuals or groups of individuals that the user has selected to receive such notifications. In one embodiment, the computing device 118 may generate notifications in real-time to a traffic service, or other website, application or public safety department. The notifications may be used to encourage repair by local authorities, facilitate routing of repair incidents, and so forth. Additionally, the computing device 118 may output actions to the driver to avoid certain lanes (e.g., with the potholes or dangerous road conditions) by suggesting alternative driving routes. It may be appreciated that when the dangerous road condition has resolved (e.g., the pothole has been repaired, etc.), the computing device 118 may provide an update to the driver to indicate that the location where the unsafe driving road condition was present is no longer unsafe.

Figure 4:
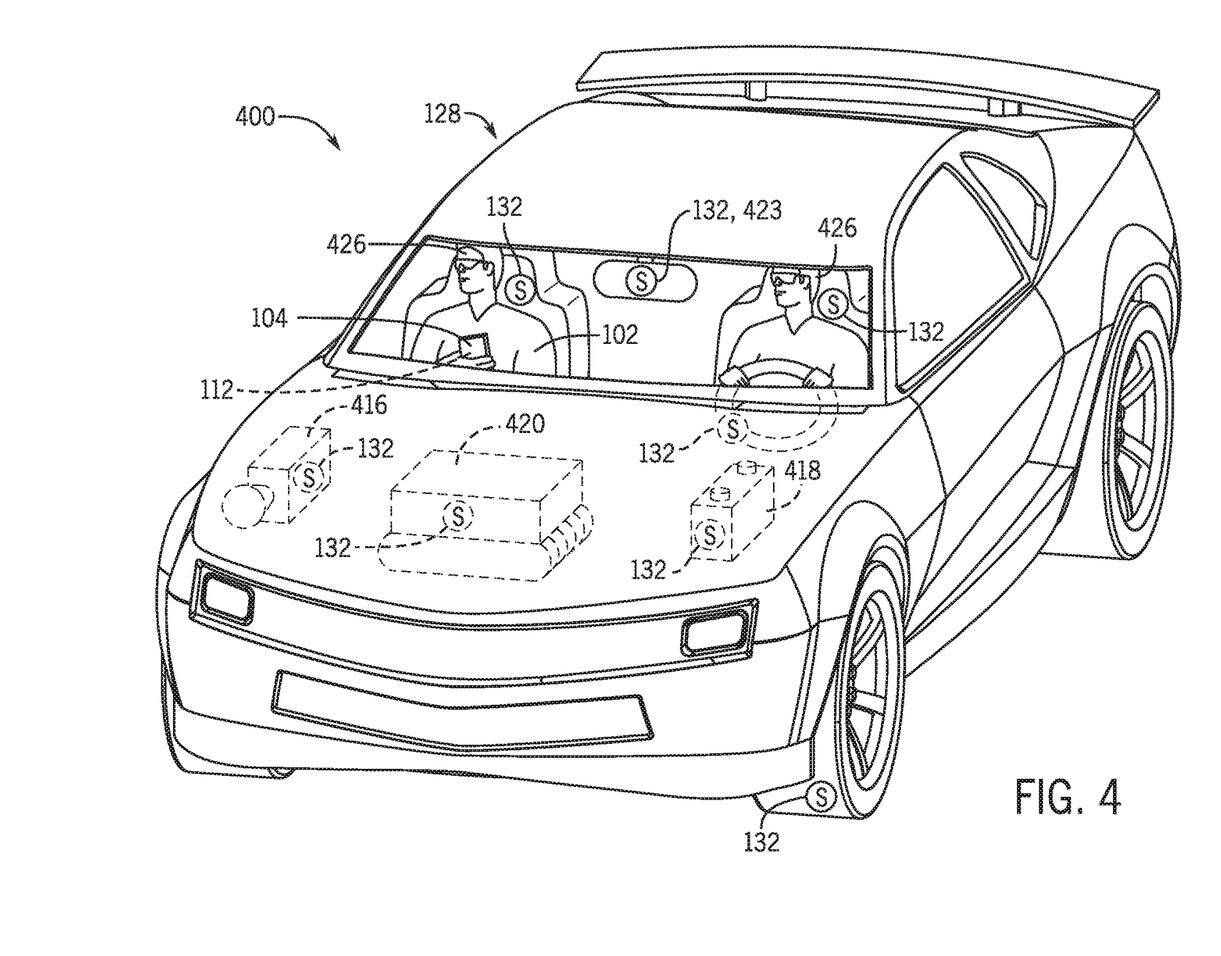
FIG. 4 is a perspective view of a vehicle used in the driving condition identification system used in a vehicle, according to an embodiment of the present disclosure.

FIG. 4 is a perspective view 400 of the vehicle 128 used in the driving condition identification system, according to an embodiment of the present disclosure. While the vehicle 128 is illustrated as an automobile, it should be understood that the present disclosure applies to any suitable vehicle, such as a truck, motorcycle, commercial vehicle, self-driving vehicle, recreational vehicle, all-terrain vehicle, boat, airplane, snowmobile, and the like. The vehicle 128 may include one or more vehicle sensors 132 that assess characteristics of the vehicle 128 and whether the vehicle 128 is in operation. The sensors 132 may include vehicle operation sensors such as a wheel sensor that detects a speed at which a wheel of the vehicle 128 is rotating. The wheel sensor may also detect the presence of external conditions that can contribute to anomalous road conditions. While in certain embodiments the computing device 118 may communicate directly with the sensors 132, it should also be understood that the information from the sensors 132 may be stored in a memory 144 of the vehicle controller 140 of the vehicle 128 and/or passed through a control device or the user device 104.

In further embodiments, other sensors (such as front or rear facing cameras 423) of the vehicle 128 may be used to determine that the vehicle 128 is in operation and/or the presence of pot holes, construction, road changes and so forth. Additionally or alternatively, sensors external to the vehicle 128 may be used to determine that the vehicle 128 is in operation. For example, the vehicle sensors 132 may include location sensors, orientation sensors, and/or motion sensors of a mobile electronic device 104 that determine that, based on the sensed location, orientation, and/or motion (e.g., calculated velocity and/or acceleration) of the mobile electronic device 104, a user 426 is in the vehicle 128 and the vehicle 128 is in operation. As discussed above, changes to the location of the vehicle 128 or sudden shifts in direction or speed may indicate presence of an unsafe road condition. It should be understood that the vehicle sensors 132 listed above are merely examples, and that any suitable sensor that indicates that provides information about the vehicle operation is contemplated as a vehicle sensor 132.

The computing system 118 may include any suitable electronic device that may communicate information to the user 426 via, for example, a communication network, such as a smartphone, a wearable electronic device, a computing device, a laptop, a tablet, a vehicle operation tracking device (such as those used by insurance companies), and the like. The computing system 118 may be used to communicate with the user 426 when it is determined that the user 426 may be encountering an unsafe road condition, such as by alerting the user 426, offering alternatives to operating the vehicle 128, incentivizing the user 426 to not operate the vehicle 128 (e.g., via offering discounts associated with auto insurance, products, services, etc.), penalizing the user 426 (e.g., via increasing payments associated with auto insurance, contacting a person familiar with the user 426, contacting a call center, and/or warning nearby drivers or autonomous vehicles). Additionally, the computing system 118 may incentivize the driver to take another route without dangerous road conditions. For example, the computing system 118 may record the driver's choice to take the safer route and offer a reward (e.g., discount or other driver reward).

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A system that detects unsafe road conditions, comprising:
    sensors configured to generate sensor information indicative of a condition in or near a vehicle, wherein the sensors comprise a noise detection sensor and a vibration sensor;
    a vehicle controller configured to receive vehicle operation data of the vehicle; and
    a device configured to receive the sensor information, vehicle location information, and the vehicle operation data, wherein the device comprises a processor configured to:
        identify a change in road surface based at least in part on the sensor information upon identifying in the sensor information a low frequency noise in data from the noise detection sensor that is associated with a relative increase in vibrations detected by the vibration sensor;
        determine a location of the change in road surface based at least in part on the vehicle operation data; and
        in response to identifying the change in road surface and the location of the change in road surface, performing an action to report the change in road surface.

2. The system of claim 1, wherein the sensors are embedded in the vehicle or in the device.

3. The system of claim 2, wherein identifying the change in road surface comprises extracting voice data from the sensor information from the noise detection sensor and identifying a characteristic noise associated with the change in road surface.

4. The system of claim 2, wherein identifying the change in road surface comprises extracting velocity, displacement, proximity, or acceleration data from the sensor information from the vibration sensor.

5. The system of claim 2, wherein the sensors further comprise a motion sensor, and wherein identifying the change in road surface comprises detecting a change in the sensor information, the sensor information comprising motion data output by the motion sensor.

6. The system of claim 2, wherein the sensor information comprises image data output from a camera, and wherein identifying the change in road surface comprises identifying a change in the image data output by the camera.

7. The system of claim 6, wherein the sensor information comprises vibration data from the vibration sensor, and further comprising comparing the change in movement of the image data output by the camera to a change in vibration data output by the vibration sensor.

8. The system of claim 1, wherein the device is a wearable or a mobile device.

9. The system of claim 1, wherein the processor is configured to distinguish between a speed bump or a pothole type of change in road surface based on the sensor information.

10. A tangible, non-transitory, machine-readable medium, comprising machine-readable instructions that, when executed by one or more processors, cause the one or more processors to:
    receive, via an noise detection sensor, information indicative of a condition in or near a vehicle;
    receive, via a vehicle controller, vehicle operation data of the vehicle;
    identify a change in road condition based at least in part on the noise detection sensor information;

determine a location of the change in road condition based at least in part on the vehicle operation data;

in response to identifying the change in road condition and the location of the change in road condition, perform an action to report the change in road condition; and offer a monetary incentive or service discount via a user device to avoid the change in road condition.

11. The tangible, non-transitory, machine-readable medium of claim 10, wherein the instructions cause the one or more processors to communicate the report the change in road condition to a notification system.

12. The tangible, non-transitory, machine-readable medium of claim 10, wherein the instructions cause the one or more processors to determine an alternate route that avoids the change in road condition.

13. A processor-implemented method for detecting road conditions, comprising:

receiving, via a sensor, sensor information indicative of a condition in or near a vehicle;

receiving, a vehicle controller, vehicle operation data of the vehicle;

identifying a change in road condition based at least in part on the sensor information, wherein identifying the change in road condition comprises identifying a concurrent event in the vehicle operation data and the sensor information characteristic of a type of road condition;

determining a location of the change in road condition based at least in part on the vehicle operation data; and in response to identifying the change in road condition and the location of the change in road condition, performing an action to report the change in road condition.

14. The method of claim 13, further comprising at least one sensor, the at least one sensor comprising one or more of a noise detection sensor, a vibration sensor, a motion sensor, an accelerometer, a gyroscope, a wheel sensor, or a camera, wherein the at least one sensor is embedded in the vehicle or in a device.

15. The method of claim 14, wherein the at least one sensor comprises the noise detection sensor and the vibration sensor, and wherein identifying the change in road condition comprises associating a humming noise extracted from noise information from the noise detection sensor that occurs concurrently with a detected increase in vibrations detected by the vibration sensor.

16. The method of claim 14, wherein identifying the change in road condition comprises detecting a change in motion data output by the vibration sensor, the motion sensor, the accelerometer, the gyroscope, or the wheel sensor.

17. The method of claim 13, wherein the concurrent event comprises a braking event in the vehicle operation data and an increase in vibrations in the sensor information that is characteristic of a speed bump.

18. A processor-implemented method for detecting road conditions, comprising:

receiving, via a sensor, sensor information indicative of a condition in or near a vehicle;

receiving, a vehicle controller, vehicle operation data of the vehicle;

identifying a change in road condition based at least in part on the sensor information, wherein identifying the road condition comprises detecting a change in motion data output by a vibration sensor, a motion sensor, an accelerometer, a gyroscope, or a wheel sensor;

determining a location of the change in road condition based at least in part on the vehicle operation data; and in response to identifying the change in road condition and the location of the road condition, performing an action to report the change in road condition.

19. A system that detects unsafe road conditions, comprising:

sensors configured to generate sensor information comprising image data and vibration data indicative of a condition in or near a vehicle;

a vehicle controller configured to receive vehicle operation data of the vehicle; and a device configured to receive the sensor information, vehicle location information, and the vehicle operation data, wherein the device comprises a processor configured to:

identify a change in road condition based at least in part on the sensor information, wherein identifying the change in road condition comprises identifying a change in the image data and comparing the change in movement of the image data to a change in vibration data;

determine a location of the change in road condition based at least in part on the vehicle operation data; and in response to identifying the change in road condition and the location of the change in road condition, performing an action to report the change in road condition.

\* \* \* \* \*